July 7, 1931.                G. GUNDERSON                1,813,159
                              PORTABLE SCOOP
                             Filed Jan. 2, 1931
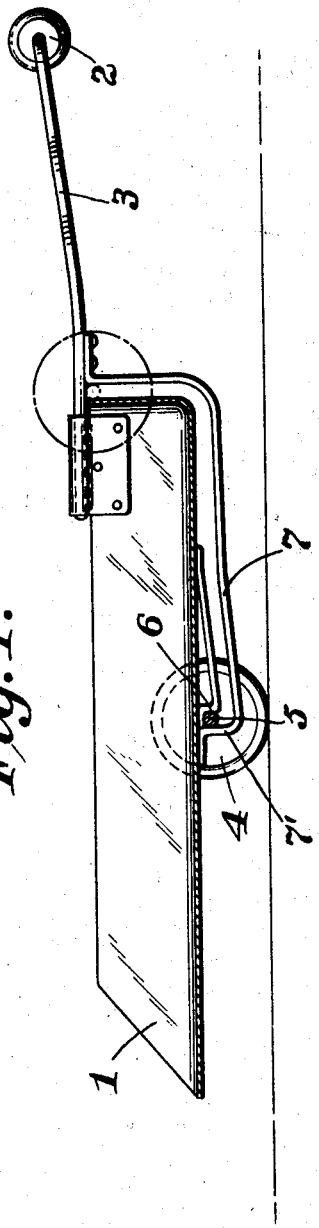
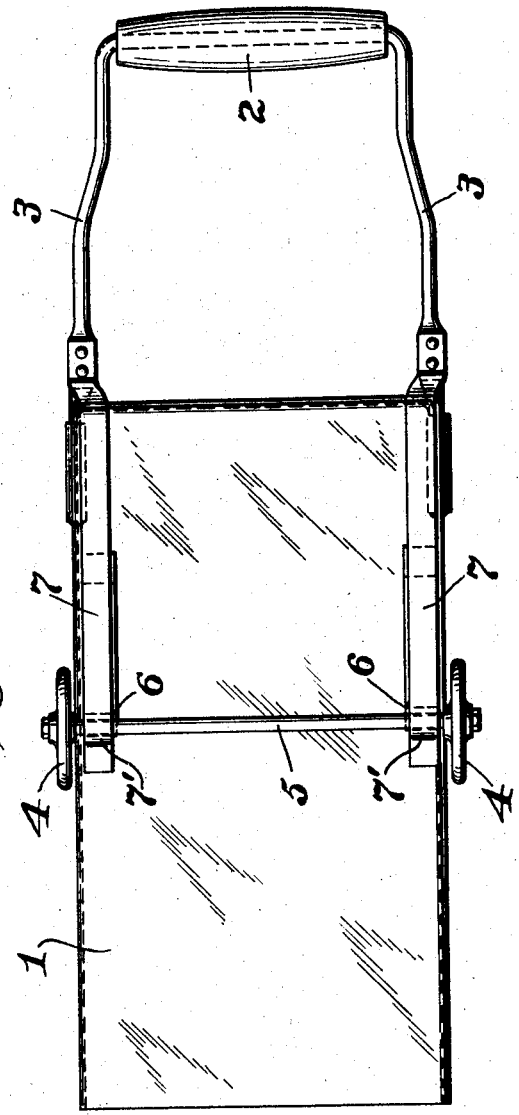
Inventor:
George Gunderson, Patented July 7, 1931

1,813,159

UNITED STATES PATENT OFFICE

GEORGE GUNDERSON, OF ST. ANSGAR, IOWA

PORTABLE SCOOP

Application filed January 2, 1931. Serial No. 506,232.

The invention concerns a portable scoop having the characteristic that it may be converted from a form to be used as a scraper to a form in which the scoop will be supported upon carrying wheels.

The invention consists in the features and combination and arrangement of parts hereinafter described and particularly pointed out in the claims.

The invention is illustrated in the accompanying drawings in which

Figure 1 is a sectional view from front to rear of a scoop embodying the invention, and Fig. 2 is a bottom plan view.

In these drawings the body of the scoop shown at 1 may be of any approved design having a bottom, side walls, and a back wall, with an open front. The usual handle shown at 2 may be connected with the body by rods 3. The wheels are shown at 4 mounted on a cross bar or axle 5, and when these wheels are in use, they are located substantially midway of the length of the scoop. The shaft is held in this midway position by engaging the bearing member 6. One of these bearing members is arranged near each edge of the bottom of the scoop, and they present shoulders extending vertically from the bottom of the scoop, against which the shaft or axle bears. The axle is held against dropping away from the scoop by guides 7 consisting of bars or rods, the front ends of which are turned upwardly at 7' and are suitably attached to the bottom of the scoop in spaced apart relation to the shoulders above mentioned. These guide bars extend substantially parallel with the bottom of the scoop to the rear thereof, and then upwardly in spaced apart relation to the rear wall of the scoop, their upper ends being suitably secured to the rods or bars forming the handle.

The members which provide the shoulders above mentioned may consist of plates or bars attached at their rear ends to the bottom of the scoop, and inclining downwardly and forwardly from these points of attachment to the point where they are bent up to provide the shoulders before mentioned. These members and the guide rods are spaced apart so that the axle or shaft carrying the wheels may be shifted from the operative position midway of the scoop to the rear thereof, and upwardly along the rear wall so as to be entirely out of the way. In this condition the scoop can be employed as a scraper, whereas when the axle, together with the wheels, are shifted to the forward position, and are held by the shouldered members about midway of the length of the scoop, the scoop becomes a truck or vehicle for the transportation of the material contained therein.

Any suitable means may be employed, if desired, for holding the axle at the upper portion of the rear vertical guideway so as to be entirely out of the way.

It will be observed that when the axle with its wheels are in their forward position in the guideways, the axle will be borne upon by the bottom of the scoop, said axle at this time being in its uppermost position relative to the guideways, and being located in front of the bearing shoulders. This position will be maintained so long as the scoop is being used as a vehicle or truck, the weight of the scoop maintaining the wheels and axle in the position noted, but when the wheels are to be thrown out of action, the axle is moved downwardly and away from the bottom of the scoop so that said axle may then be moved past the shoulder members to the rear of the scoop.

The scoop may be provided with means whereby a horse or tractor may be hitched thereto for drawing it along.

I claim as my invention:

1. A scoop, an axle carrying wheels, and means for holding the said axle to the scoop, said axle being shiftable along said holding means from operative position under the scoop to a position at the rear of said scoop, substantially as described.

2. In combination with a scoop, guide means extending along the lower portion thereof, and upwardly at the rear, and an axle carrying wheels, mounted in said guideway, and shiftable from a position under the bottom of the scoop to a position at the rear of the scoop in the vertical portions of the guideway, substantially as described.

3. In combination with a scoop, bearing means on the bottom of the scoop to present a shoulder or bearing surface to resist the thrust of an axle, an axle extending across the bottom of the scoop and bearing on said shoulder means, to be held thereby against backward thrust, and guide means along which the shaft may be shifted to the rear of the scoop, substantially as described.

4. In combination with a scoop, an axle extending across the same, and upon which the bottom of the scoop rests, bearing means in rear of said axle to sustain the rearward thrust of the axle, wheels mounted on the axle, and guide means along which the axle may be shifted when lowered from engagement with the shoulders to thereby be moved from operative position.

In testimony whereof, I affix my signature.

GEORGE GUNDERSON.